Patented Nov. 20, 1923.

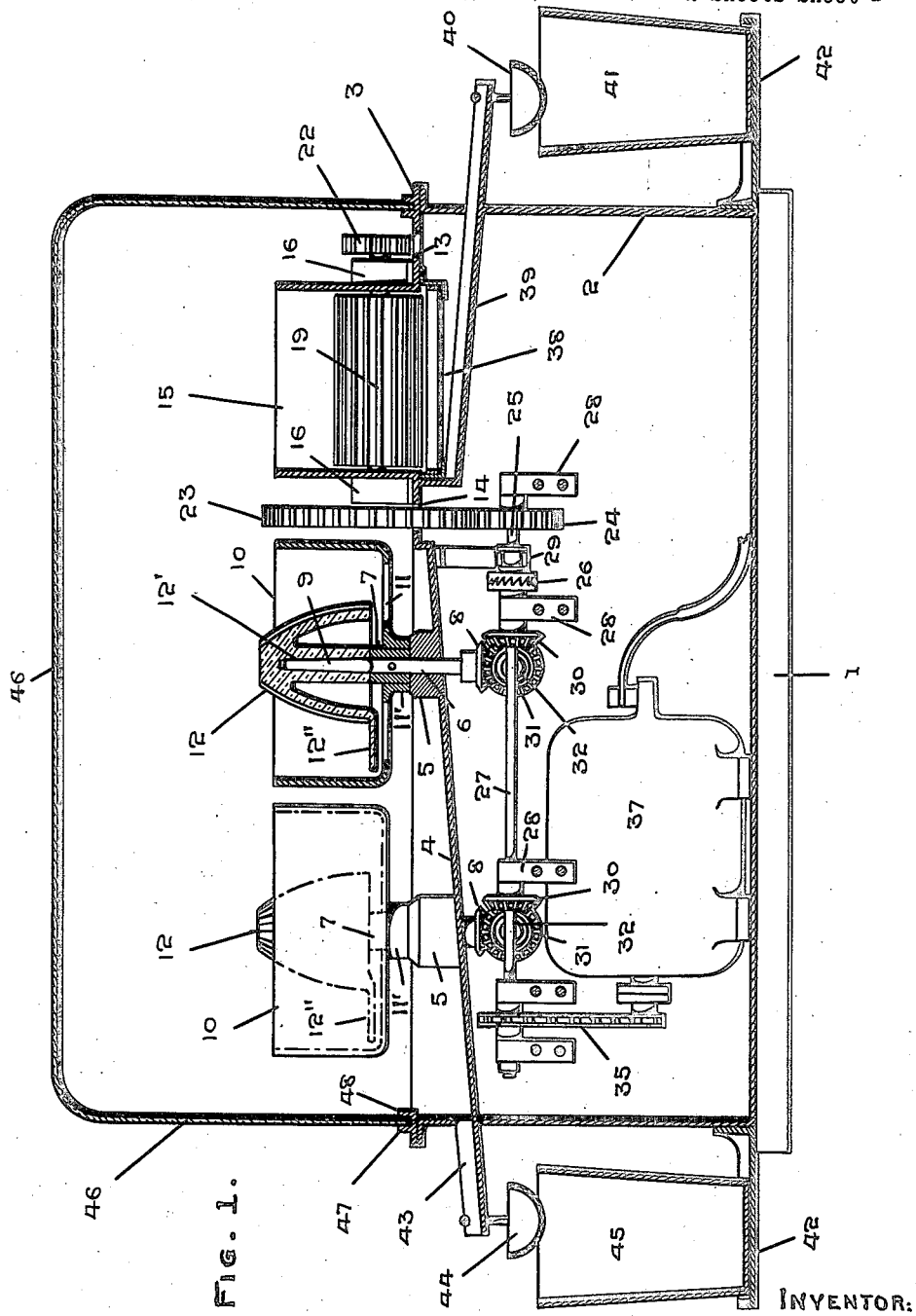

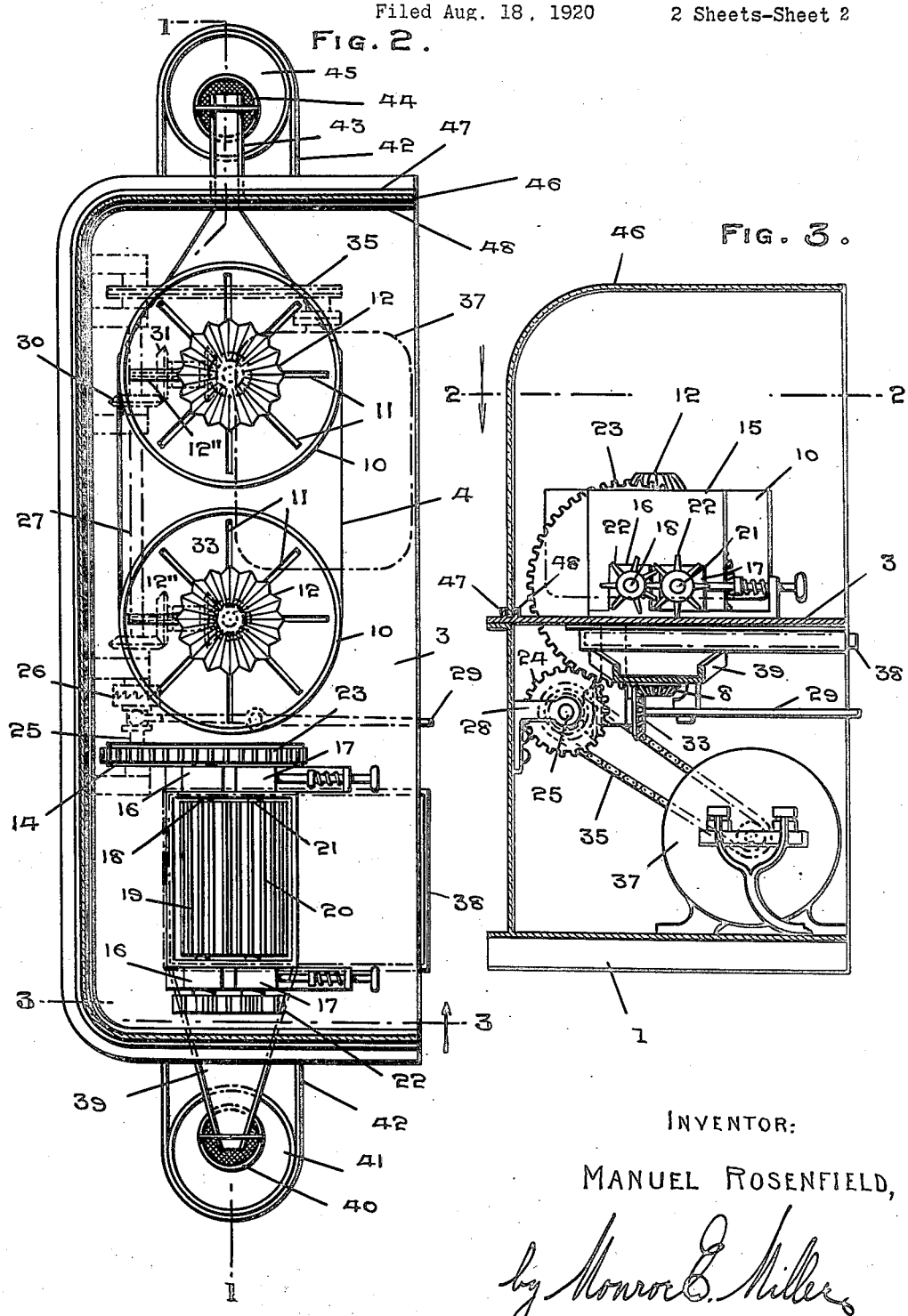

1,474,849

UNITED STATES PATENT OFFICE.

MANUEL ROSENFIELD, OF ALAMEDA, CALIFORNIA.

JUICE EXTRACTOR.

Application filed August 18, 1920. Serial No. 404,448.

*To all whom it may concern:*

Be it known that I, MANUEL ROSENFIELD, a citizen of the United States, and a resident of the city of Alameda, county of Alameda, State of California, have invented Improvements in Juice Extractors; and I do hereby declare the following to be a full, clear, and exact description of my invention, such as will enable others skilled in the art to which it pertains to make and use the same.

This invention relates to a device for extracting the juices from fruits for use in making refreshments, preserving and the like, and the invention aims to provide a device of that character having novel and improved features of construction which render it particularly suited and efficient for the intended purposes.

Another object is the provision of such a device having means above a tabletop for acting on the fruit, with actuating means located under said tabletop, said means being protected, and means being provided for delivering the juices into receptacles.

A further object is the provision of a novel means for extracting the juices from citrus fruit, such as oranges, lemons, grapefruit, etc.

The invention is illustrated in the accompanying drawings, wherein:

Figure 1 is a view of the device, partly in elevation and partly in section substantially on the line 1—1 of Fig. 2.

Fig. 2 is a plan view showing the hood in section on the line 2—2 of Fig. 3.

Fig. 3 is a vertical transverse section on the line 3—3 of Fig. 2.

A suitable base 1 is provided on which a housing 2 is mounted, which is open at the rear for access to the parts within the housing. A table top 3 is disposed on the housing 2, and has a longitudinal depression forming a trough 4 sloping to one end of the housing, and longitudinally spaced bosses 5 rise from the bottom of the trough and provide bearings for a pair of vertical rotatable spindles 6 which extend through said bosses or bearings. Collars 7 are secured on said spindles and seat on the bosses for supporting the spindles, and bevel pinions 8 are secured to the lower ends of said spindles within the housing 2 for driving said spindles, as will hereinafter more fully appear. The upper terminals of the spindles are tapered, as at 9, and of square or other non-circular cross section.

Above the trough 4 and bosses 5 are disposed a pair of cups 10 having radial slits 11 in the bottom thereof and central hubs 11' mounted loosely on the collars 7 and seated on the bosses 5, whereby said cups are conveniently supported with the upper terminals of the spindles projecting upwardly centrally within the cups. The cups may turn, although they will stand still if touched by the hand or fruit. Within each cup there is disposed the abrasion conoid or bulb 12 having a downwardly opening socket 12' to receive the upper terminal of the spindle, for rotating the conoid with the spindle, and the periphery of the conoid is toothed or corrugated for gouging out the juice cells of halved citrus fruit and the like. Each conoid 12 has a radial fluke 12'' for scraping or removing the juice cells or pulp of the fruit from the edges of the shells.

In using the conoids or bulbs 12, the halved fruit is placed down on the conoids by hand, and such conoids will gouge out the juicy cells or interiors of the fruit, and the juice will be caught in the cups 10 to flow down through the slits 11 into the trough 4. Conoids or members 12 of different sizes can be used interchangeably for different kinds of fruit, said conoids being readily lifted off of the spindles, and the cups 10 are also readily lifted off of the collars 7 when the conoids have been removed, so that the parts can be readily removed for cleaning and replacement.

The device also includes a fruit crusher for crushing berries, cherries, grapes, etc., and such crusher includes a hopper or box 15 on the tabletop 3 beyond the inner end of the trough 4 and located between slots 13 and 14 provided in said top. Rigid bearings 16 are disposed at the opposite sides of the hopper 15 and spring-pressed bearings 17 are disposed at the same sides of the hopper and are yieldingly moved toward the bearings 16, as will be readily apparent. A shaft 18 is journaled in the bearings 16 and a corrugated crushing roll 19 is mounted on the shaft 18 within the hopper. A second corrugated crushing roll 20 is mounted on a shaft 21 within the hopper to cooperate with the roll 19, and the shaft 21 is mounted in the bearings 17, whereby the roll 20 is yieldingly moved toward or against the roll 19, so that the fruit which is placed in the hopper will be crushed in passing downwardly between the rolls. Star gears 22 are secured on the shafts 18 and 21 and work in the slot 13 for rotating both rolls in unison, and permitting the rolls to separate while being driven. A gear wheel 23 is secured to the other end of the shaft 18 and extends through the slot 14 to mesh with a pinion 24 within the housing 2 secured on a short shaft 25. A clutch 26 is employed for connecting the shaft 25 with a drive shaft 27 which is in alinement with the shaft 25, and said shafts are mounted in bearings 28 supported from the front wall of the housing 2. The clutch 26 is opened and closed by a lever 29 supported from the tabletop 3 and extending to the rear for convenient operation.

The fruit juice extractors are driven from the shaft 27. Thus, bevel gears 30 are secured on the shaft 27 and mesh with similar gears 31 secured on transverse shafts 32 which have bevel gears 33 with which the bevel pinions 8 mesh. The spindles 6 are thus rotated by the shaft 27, and the fruit crusher is rotated from said shaft whenever the clutch 26 is closed, the crusher being stopped when the clutch is opened. The shaft 27 is connected by a sprocket chain 35 or otherwise with an electric motor 37 mounted in the housing 2.

A wire mesh screen 38 is inserted under the crushing rolls 19 and 20, for catching the pulp or solid material of the crushed fruit, and the juices pass down through the screen into a trough 39 disposed under the screen and rolls and sloping opposite to the end of trough 4 and extending through the housing opposite to the end to which the trough 4 extends. A cup screen or strainer 40 is suspended from the projecting end or spout of the trough 39 on the exterior of the housing 2, through which the juice flows from the trough or spout into the receptacle 41. The housing 2 has shelves or brackets 42 at the opposite ends for supporting the receptacles.

In a similar manner, the trough 4 has a delivery spout 43 projecting from the corresponding end of the housing, from which a cup screen or strainer 44 is suspended and through which the juice flows into the receptacle 45. The juice from the crusher flows into the receptacle 41 at one end, while the juice from the extractors flows into the receptacle 45 at the opposite end.

In order to protect the crusher and extracting means, a hood 46, preferably of glass or transparent material, is disposed over the tabletop with its lower edge located between upstanding flanges 47 and 48 on the top along the edges thereof. Said hood can have its lower edge cemented or otherwise secured between the flanges 47 and 48, and the hood, like the housing 22 is open at the rear, so that access into the hood from the rear can be had for placing the fruit into the hopper 15 and cups 10.

Having thus described my invention, what I desire to claim and to secure by Letters Patent is:—

1. A device of the character described comprising a bearing, an upstanding spindle extending through said bearing, a cup having slits in its bottom and having a central portion loosely and removably disposed around the spindle and seated on said bearing, means for catching liquid dripping from the cup around said bearing, and an abrasion member removably fitted on the spindle within said cup.

2. A device of the character described comprising a bearing, a spindle extending upwardly through the bearing, a collar on the spindle seated on said bearing, a cup having slits in its bottom and a central hub fitted on said collar, and an abrasion member fitted on the spindle within said cup.

3. A device of the character described comprising an upstanding spindle, a cup removably fitted around the spindle and having slits in the bottom thereof, and an abrasion member removably fitted on the spindle within the cup and having a radial fluke.

4. A device of the character described comprising a tabletop having a depressed trough, a bearing rising from the bottom of the trough, a spindle extending upwardly through said bearing, a collar on the spindle seated on said bearing, a cup having slits in the bottom thereof and a central hub fitted loosely on said collar, and an abrasion member fitted removably on said spindle above the collar and having a radial fluke.

In testimony whereof, I have signed my name to this specification in the presence of a subscribing witness.

MANUEL ROSENFIELD.

Witness:
ROBERT MORGENIER.